(12) United States Patent
Yoshimoto

(10) Patent No.: US 7,936,654 B2
(45) Date of Patent: May 3, 2011

(54) OPTICAL DISK DEVICE

(75) Inventor: Tadafumi Yoshimoto, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 377 days.

(21) Appl. No.: 12/188,299

(22) Filed: Aug. 8, 2008

(65) Prior Publication Data
US 2009/0059754 A1 Mar. 5, 2009

(30) Foreign Application Priority Data
Sep. 4, 2007 (JP) ................................ 2007-229105

(51) Int. Cl.
*G11B 20/18* (2006.01)
(52) U.S. Cl. ............... 369/53.22; 369/53.23; 369/44.35; 369/53.28
(58) Field of Classification Search ............... 369/53.23, 369/53.28, 44.41, 53.22, 112.03, 44.35
See application file for complete search history.

(56) References Cited

U.S. PATENT DOCUMENTS

| | | | |
|---|---|---|---|
| 6,058,082 A | 5/2000 | Hwang | |
| 6,891,789 B2* | 5/2005 | Watt et al. | 369/53.23 |
| 6,934,228 B2* | 8/2005 | Shimano et al. | 369/44.35 |
| 7,746,747 B2* | 6/2010 | Hasegawa | 369/53.22 |
| 2002/0150008 A1* | 10/2002 | Shimano et al. | 369/44.41 |
| 2003/0086347 A1 | 5/2003 | Kobayashi | |
| 2004/0100890 A1* | 5/2004 | Lee | 369/53.23 |
| 2004/0196771 A1* | 10/2004 | Shimano et al. | 369/112.03 |
| 2005/0068873 A1 | 3/2005 | Chung | |
| 2005/0105433 A1* | 5/2005 | Juan et al. | 369/53.23 |

FOREIGN PATENT DOCUMENTS

| | | |
|---|---|---|
| EP | 1 884 933 A2 | 2/2008 |
| JP | 2002-269770 A | 9/2002 |
| JP | 2002-367193 A | 12/2002 |
| JP | 2003-323716 A | 11/2003 |
| JP | 2005-259252 A | 9/2005 |
| JP | 2007-018589 A | 1/2007 |

* cited by examiner

*Primary Examiner* — Thuy N Pardo
(74) *Attorney, Agent, or Firm* — Global IP Counselors

(57) ABSTRACT

An optical disk device includes an optical pickup, a focus drive section, a detection section, a time measurement section and a disk identification section. The detection section detects reflected light reflected from an optical disk while the focus drive section moves a focus position of the optical pickup. The time measurement section measures a focus search time between when the reflected light reflected from a disk surface of the optical disk is detected and when the reflected light reflected from an information recording layer of the optical disk is detected. The time measurement section measures a false reflection search time between when the reflected light reflected from the disk surface is detected and when false reflection light is detected. The disk identification section calculates a ratio of the focus search time to the false reflection search time, and identifies a type of the optical disk based on the ratio.

17 Claims, 6 Drawing Sheets

OPTICAL DISK DEVICE

CROSS-REFERENCE TO RELATED APPLICATIONS

This application claims priority to Japanese Patent Application No. 2007-229105 filed on Sep. 4, 2007. The entire disclosure of Japanese Patent Application No. 2007-229105 is hereby incorporated herein by reference.

BACKGROUND OF THE INVENTION

1. Field of the Invention

The present invention generally relates to an optical disk device. More specifically, the present invention relates to an optical disk device that reproduces various types of optical disks.

2. Background Information

Optical disks are widely used as data recording media with which a large volume of data can be accessed at high speed and low cost and without contact. Specifically, the optical disks are widely used as data recording media for personal computers and for recording and reproduction of digital audio data and digital video data. In particular, next-generation optical disks (Blu-ray Disc (BD®), HD-DVD®, etc.) have been proposed in recent years as rewritable optical disks with high-volume. Along with this, there has been a desire for an optical disk device that records and reproduces information to and from various types of optical disks, such as a CD, a DVD®, and the next-generation optical disks. Thus, with the optical disk device, it is necessary to reliably identify the type of the optical disk mounted in the optical disk device.

A conventional optical disk device includes a three-wavelength compatible objective lens to handle three wavelengths corresponding to the types of the optical disks. Specifically, the conventional optical disk device handles three kinds of laser beams having different wavelengths to record and reproduce information. With the three-wavelength compatible objective lens, an optical head installed in the optical disk device can be made compact.

The three-wavelength compatible objective lens handles three kinds of laser beams having different wavelengths, namely, 780 nm for the CD, 650 for the DVD, and 405 nm for the next-generation optical disk. In the physical structure of the optical disks, the distance from a disk surface to an information recording face is 1.2 mm for the CD, 0.6 mm for the DVD, and 0.1 mm for the next-generation optical disk. However, the three-wavelength compatible objective lens makes it possible to control focus for all of the optical disks.

With the three-wavelength compatible objective lens, the optical head can be made smaller. Each of focus distances is different for each of the wavelengths. Thus, when the three-wavelength compatible objective lens is employed in the optical disk device, the type of the optical disk mounted in the optical disk device can be misidentified, particularly because of variance in the sensitivity characteristics of optical elements of the optical pickup.

Japanese Laid-Open Patent Application Publication No. 2005-25952 discloses a method for identifying an optical disk mounted in an optical disk device having a three-wavelength compatible objective lens. With the optical disk device, information is recorded or reproduced by selectively irradiating an information recording face of the optical disk via the three-wavelength compatible objective lens with laser beams of three different wavelengths for the CD, the DVD and the BD. When a disk identification processing is commenced, first, the BD laser is flashed (Step S1). A position of a beam expander for correcting spherical aberration is set to a position for the BD (Step S2). Then, a focus search processing is performed (Step S3). During the focus search processing, a focus search time from when the reflected light from the disk surface of the optical disk is detected to when the reflected light from the information recording face is detected is measured. Then, it is determined whether or not the focus search time is less than a predetermined value (Step S4). If the focus search time is less than the predetermined value, then the optical disk is determined to be the BD. If the focus search time is greater than the predetermined value, then the DVD laser is flashed (Step S5). Then, it is determined whether or not the mounted optical disk is the DVD in the same manner as in the processing of steps S1 to S4. If it is determined that the mounted optical disk is not the DVD, then the CD laser is flashed. The position of the beam expander is set to a position for the CD. Then, the focus search processing is performed. It is determined whether or not the mounted optical disk is the CD. If it is determined not to be the CD, then it is determined that there is no disk.

As discussed above, the technology discussed in Japanese Laid-Open Patent Application Publication No. 2005-25952 involves detecting the difference in distances from the disk surface to the information recording face, which is a difference in the physical structures of the optical disks, based on the focus search time. Specifically, the focus search time is compared with the predetermined value. As a result, the type of optical disk mounted in the optical disk device is identified. As mentioned above, the distance from the disk surface to the information recording face decreases in the order of CD>DVD>BD, so the focus search time from the disk surface to the information recording face as measured by the focus search processing similarly decreases in the order of CD>DVD>BD. This relationship is used to set the predetermined values for identifying three types of the optical disks by comparing the predetermined values with the focus search time.

With the conventional optical disk device discussed in Japanese Laid-Open Patent Application Publication No. 2005-25952, the predetermined values for performing the disk identification processing are set as values of time. Specifically, the focus search time is measured. Then, the predetermined values, that are values of time, are used as thresholds for comparing with the focus search time. As a result, the type of the optical disk is identified. In this case, the focus search time becomes shorter or longer depending on variance in motor torque at which the focus search processing is driven, or in the light receiving sensitivity of a light receiving element of the optical disk device. Therefore, the predetermined values used for the disk identification processing are set by taking into account the variance between individual optical disk devices. However, it is difficult to keep up with the variance among mass-produced optical disk devices. Thus, it is difficult to correctly identify the type of the optical disk mounted in the optical disk device. With another method, the sensitivity of a focus actuator can be adjusted to maintain constant focus search speed and account for the above-mentioned variance during producing the optical disk device. However, additional step to adjust the sensitivity of the focus actuator is needed.

In view of the above, it will be apparent to those skilled in the art from this disclosure that there exists a need for an improved optical disk device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide an optical disk device with which a type of an optical disk mounted in the optical disk device can be reliably identified.

In accordance with one aspect of the present invention, an optical disk device includes an optical pickup, a focus drive section, a detection section, a time measurement section and a disk identification section. The optical pickup is configured to selectively emit a plurality of laser beams of different wavelengths to an optical disk mounted in the optical disk device. The focus drive section is configured to drive the optical pickup to move a focus position of the optical pickup in a direction perpendicular to the optical disk. The detection section is configured to detect reflected light reflected from the optical disk while the focus drive section moves the focus position of the optical pickup. The time measurement section is configured to measure a focus search time while the focus drive section moves the focus position of the optical pickup. The focus search time is a period between when the reflected light reflected from a disk surface of the optical disk is detected and when the reflected light reflected from an information recording layer of the optical disk is detected. The time measurement section is configured to measure a false reflection search time while the focus drive section moves the focus position of the optical pickup. The false reflection search time is a period between when the reflected light reflected from the disk surface of the optical disk is detected and when false reflection light is detected. The false reflection light is detected when the focus position of the optical pickup is located at a position other than the disk surface and the information recording layer of the optical disk. The disk identification section is configured to calculate a ratio of the focus search time to the false reflection search time, and identify a type of the optical disk based on the ratio.

With the optical disk device of the present invention, it is possible to provide an optical disk device with which a type of an optical disk mounted in the optical disk device can be reliably identified.

These and other objects, features, aspects and advantages of the present invention will become apparent to those skilled in the art from the following detailed descriptions, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
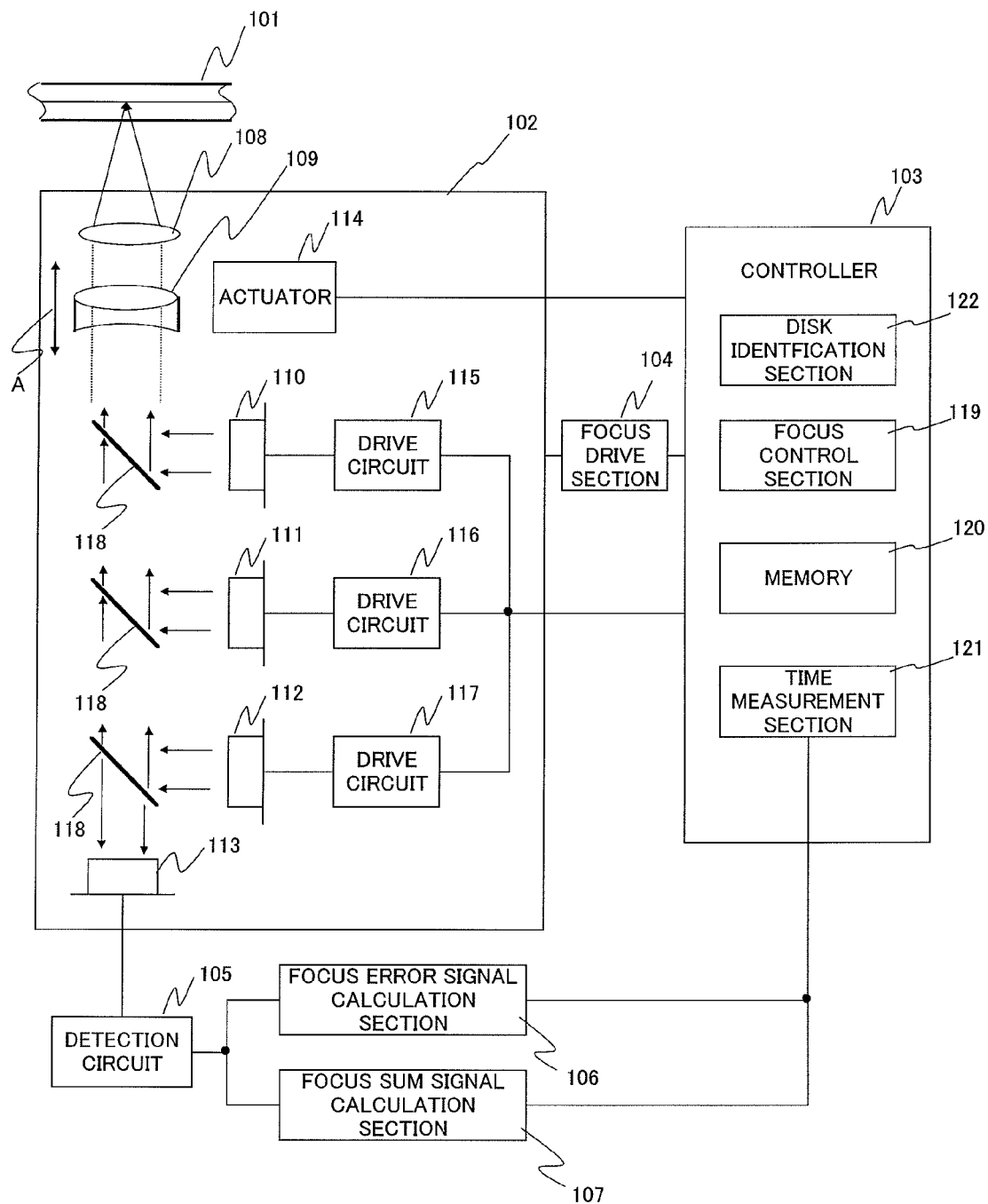
FIG. 1 is a block diagram of an optical disk device in accordance with a first embodiment of the present invention.

FIG. 1 is a block diagram of an optical disk device pertaining to the present invention. The optical disk device includes an optical pickup 102, a controller 103, a focus drive section 104, a detection circuit 105, a focus error signal calculation section 106 and a focus sum signal calculation section 107. The optical pickup 102 records and reproduces information to and from an optical disk 101 by irradiating the optical disk 101 with a laser beam. A CD, a DVD® or a next-generation optical disk is mounted in the optical disk device as the optical disk 101. The next-generation optical disk includes a Blu-ray Disc (BD®), a HD-DVD®, or the like. The controller 103 controls operations of the optical disk device, such as a disk identification processing and a focus search processing. The focus drive section 104 moves the optical pickup 102 in a direction perpendicular to the optical disk 101. The detection circuit 105 detects a signal received by the optical pickup 102. The focus error signal calculation section 106 calculates a focus error signal from an output signal of the detection circuit 105. The focus sum signal calculation section 107 calculates a focus sum signal from the output signal of the detection circuit 105.

The optical pickup 102 includes a BD-use laser generating element 110, a DVD-use laser generating element 111, a CD-use laser generating element 112, an optical system having an objective lens 108 and a beam expander 109, a light receiving element 113, an actuator 114, drive circuits 115, 116 and 117 and half mirrors 118. Each of the laser generating elements 110, 111 and 112 includes a laser diode. The laser diodes generate laser beams having different wavelengths, respectively, along with the optical system. The optical system is disposed opposite a lower disk surface of the optical disk 101. The optical system corrects spherical aberration. The objective lens 108 includes a three-wavelength compatible objective lens. The beam expander 109 includes a plurality of lenses. The objective lens 108 is moved along with the beam expander 109 by the actuator 114 in a direction perpendicular to the lower disk surface of the optical disk 101 (see an arrow A in FIG. 1). The actuator 114 makes use of electromagnetic force, for example. The light receiving element 113 includes a photodiode. Each of the laser generating elements 110, 111 and 112 is driven to emit light by respective one of the drive circuits 115, 116 and 117 in response to a command from the controller 103. For example, the BD-use laser generating element 110 generates a laser beam with a wavelength of 405 nm for the BD. The DVD-use laser generating element 111 generates a laser beam with a wavelength of 650 nm for the DVD. The CD-use laser generating element 112 generates a laser beam with a wavelength of 780 nm for the CD. Each of the half-mirrors 118 reflects the laser beam generated by respective one of the laser generating elements 110, 111 and 112 to irradiate the optical disk 101 via the objective lens 108 and the beam expander 109. Furthermore, the half-mirrors 118 guide reflected light reflected from the optical disk 101 to the light receiving element 113. Each of the half-mirrors 118 can be replaced with a polarized beam splitter. The reflected light received by the light receiving element 113 is detected by the detection circuit 105 and converted into an electrical signal. The controller 103 includes a focus control section 119, a memory 120, a time measurement section 121 and a disk identification section 122. The focus control section 119 controls the focus drive section 104. The memory 120 stores various data related to operations of the optical disk device. The time measurement section 121 measures time during the disk identification processing and the focus search processing. The disk identification section 122 performs the disk identification processing.

Figure 2C:
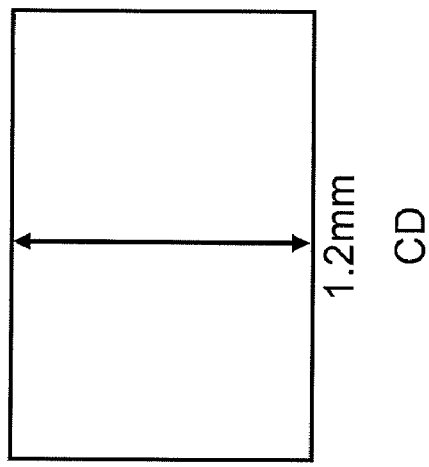
FIG. 2C is a schematic cross sectional view of a CD.
Figure 2B:
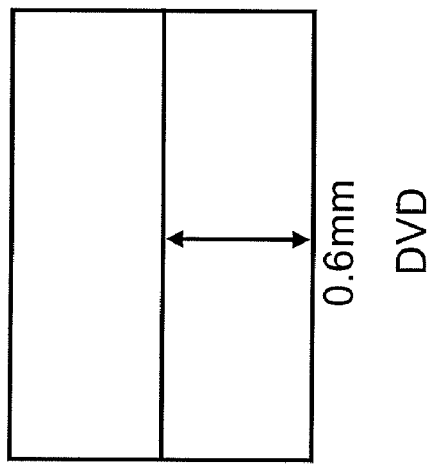
FIG. 2B is a schematic cross sectional view of a DVD.
Figure 2A:
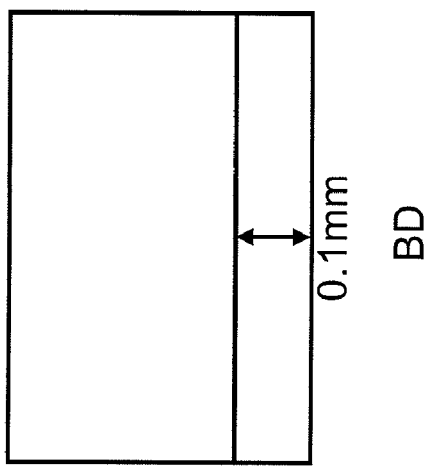
FIG. 2A is a schematic cross sectional view of a BD.

FIGS. 2A-2C show structures of the optical disks mounted in the optical disk device, respectively. FIG. 2A shows a structure of the next-generation optical disk (such as the BD). FIG. 2B shows a structure of the DVD. FIG. 2C shows a structure of the CD. Each of the structures has a different distance from the lower disk surface that is irradiated with the laser beam to an information recording face (e.g., an information recording layer) on which data is recorded. Specifically, the distance is about 0.1 mm with the BD, about 0.6 mm with the DVD, and about 1.2 mm with the CD. In other words, with the CD, the information recording face is formed on an upper disk surface of the optical disk 101.

Figure 3A:
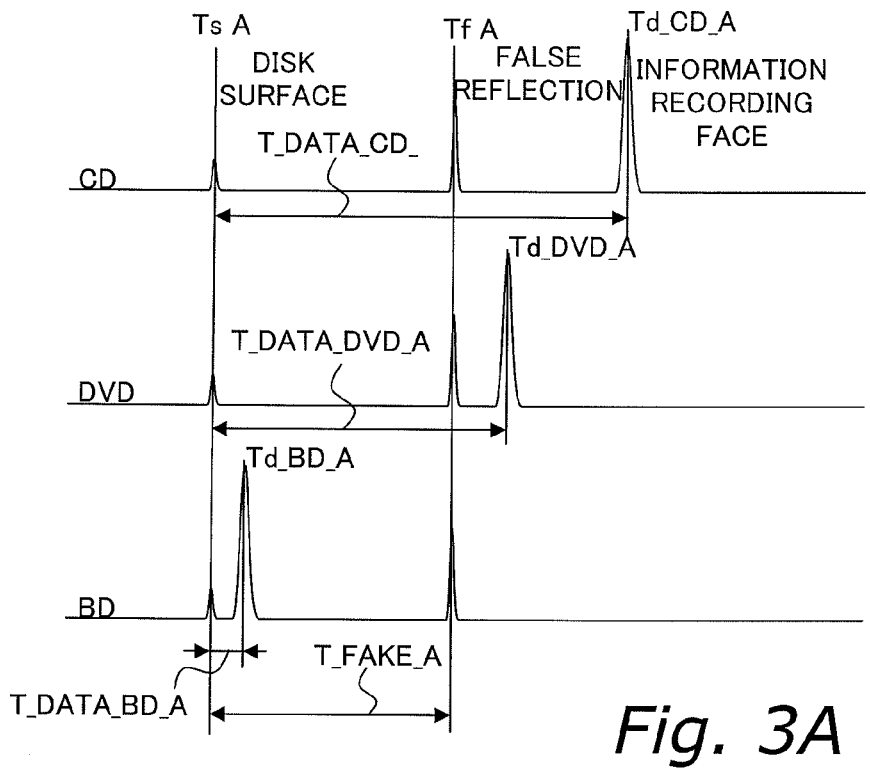
FIG. 3A is a diagram illustrating a focus sum signal of each of optical disks mounted in an optical disk device A.
Figure 3B:
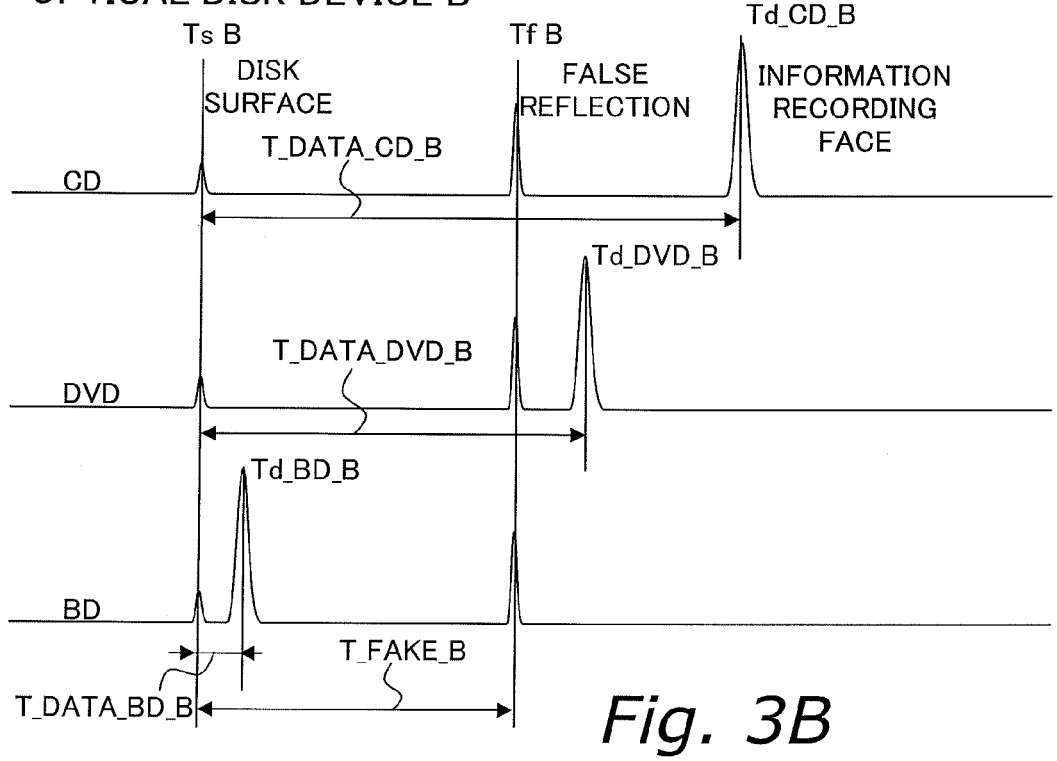
FIG. 3B is a diagram illustrating a focus sum signal of each of the optical disks mounted in an optical disk device B.

FIGS. 3A and 3B show the focus sum signal (hereinafter referred to as FS signal) received from different types of the optical disks when a CD-use laser beam is emitted. FIG. 3A shows the FS signal of the optical disk device A. FIG. 3B shows the FS signal of the optical disk device B. An upper waveform in FIG. 3A shows a change in the reflected light intensity versus time when the focus search processing is performed using the CD-use red laser beam (with the wavelength of approximately 780 nm) and the CD is mounted in the optical disk device A. The "focus search processing" is an operation in which the objective lens 108 is moved relative to the optical disk 101 by the actuator 114 to change a focus position. The focus search processing involves continuous movement of the focus position at a specific speed from a lower position to an upper position, that is, from a position farthest away from the lower disk surface toward the upper disk surface. As a result, the laser beam directed to the CD is first reflected by the lower disk surface of the CD, and detected as a first reflected light peak Ts_A. When a false reflection search time T_FAKE_A has elapsed after the first reflected light peak Ts_A is detected, a false reflection (e.g., fake reflection) is detected as a second reflected light peak Tf_A. In other words, the false reflection search time T_FAKE is a period from when the first reflected light peak Ts is detected by receiving the reflected light reflected at the lower disk surface to when the second reflected light peak Tf is detected by receiving the false reflection. The "false reflection" here is a reflected light detected when the focus position is located at a place that is neither the lower and upper disk surfaces nor the information recording face in the optical disk device using the three-wavelength compatible objective lens. When an attempt is made to deal with the various kinds of the optical disks 101 with the three-wavelength compatible objective lens, the false reflection tends to occur. Specifically, in the course of moving the objective lens 108 toward the optical disk 101, a false signal (FAKE) is detected by the time when the reflected light reflected at the information recording face is captured. A laser light that is unnecessary while varying the numerical aperture in the interior of the objective lens 108 and is diffusely reflected after entering the objective lens 108 as reflected light from the information recording face or the disk surface of the optical disk 101 is detected as the false reflection. Particularly when the CD is mounted, the smaller numerical aperture results in more of the laser light being unnecessary. Thus, when the focus search processing is performed, the false reflection can be detected at a distinct level. Then, after a focus search time T_DATA_CD_A has elapsed since the first reflected light peak Ts_A is detected, the focus position reaches the information recording face where data has been recorded. In other words, the focus search time T_DATA is a period from when the first reflected light peak Ts is detected by receiving the reflected light reflected at the lower disk surface to when the third reflected right reflected at the information recording face. Then, the laser light is reflected at the information recording face, and the third reflected light peak is detected at time Td_CD_A.

A middle waveform in FIG. 3A shows a change in reflected light intensity versus time when the DVD has been mounted in the optical disk device A and the focus search processing is performed using the CD-use red laser beam (with the wavelength of approximately 780 nm). Just as discussed above, the result of performing the focus search processing is that the laser beam that irradiates the DVD is reflected by the lower disk surface of the DVD (the lowermost face) and detected as the first reflected light peak Ts_A. When the false reflection search time T_FAKE_A has elapsed after the first reflected light peak Ts_A is detected, the false reflection occurs and is detected as the second reflected light peak Tf_A. After a focus search time T_DATA_DVD_A has elapsed since the first reflected light peak Ts_A is detected, the focus position reaches the information recording face where data has been recorded. Then, the laser light is reflected at the information recording face, and the third reflected light peak is detected at time Td_DVD_A.

A lower waveform in FIG. 3A shows a change in reflected light intensity versus time when the BD has been mounted in the optical disk device A and the focus search processing is performed using the CD-use red laser beam (with the wavelength of approximately 780 nm). Just as discussed above, the result of performing the focus search processing is that the laser beam that irradiates the BD is reflected by the lower disk surface of the BD (the lowermost face) and detected as the first reflected light peak Ts_A. When the false reflection search time T_FAKE_A has elapsed after the first reflected light peak Ts_A is detected, the false reflection occurs and is detected as the second reflected light peak Tf_A. After a focus search time T_DATA_BD_A has elapsed since the first reflected light peak Ts_A is detected, the focus position reaches the information recording face where data has been recorded. Then, the laser light is reflected at the information recording face, and the third reflected light peak is detected at time Td_BD_A.

As shown in FIG. 3, each of the focus search times T_DATA from the reflection at the lower disk surface until the reflection at the information recording face decreases in the order of CD, DVD and BD. As shown in FIG. 2, this is because the distance from the lower disk surface to the information recording face decreases in the order of CD, DVD and BD, and the focus search speeds are equal. Also, the false reflection search time T_FAKE_A, which is a period from the reflection at the lower disk surface until the false reflection is generated, remains constant for each of the optical disks. This is because the false reflection does not occur at any face of the optical disk 101, but rather inside the optical system of the optical pickup 102. Thus, the false reflection search time T_FAKE_A is maintained constant regardless of the distance from the lower disk surface to the information recording face for each of the optical disks.

The FS signal of the optical disk device B in FIG. 3B will now be described. Just as with the above-mentioned optical disk device A, the waveforms of FS signals detected for the three different kinds of the optical disks are shown in the order of CD, DVD and BD, starting from the top. Compared to the optical disk device A, with all of the optical disks, each of false reflection search times T_FAKE_B from the reflection at the lower disk surface until the false reflection, and focus search times T_DATA_CD_B, T_DATA_DVD_B and T_DATA_BD_B from the reflection at the lower disk surface until the reflection at the information recording face increases. This is because the focus search speed is slower with the optical disk device B than with the optical disk device A due to variance in the characteristics of constituent elements, such as lower optical element sensitivity or slower focus drive speed.

Thus, because of the variance in the characteristics had by individual optical disk devices, the focus search speed varies. Thus, a false reflection search time from the reflection at the lower disk surface until the false reflection and a focus search time from the reflection at the lower disk surface until the reflection at the information recording face also vary from one optical disk device to the next. Therefore, even if thresholds are set based on the differences in the time Td_CD, Td_DVD and Td_BD from the reflection at the lower disk surface to the reflection at the information recording face during the focus search with the CD, the DVD or the BD to identify the type of the optical disk 101, the time Td_CD, Td_DVD and Td_BD that actually takes to reach the information recording face from the lower disk surface during the focus search will vary due to the variance in the characteristics of individual optical disk devices as discussed above. Thus, it can be particularly difficult to properly identify the type of the optical disk 101 when the variances of the constituent elements of the optical pickup 102 are multiplied and the characteristics of individual optical disk devices vary widely.

On the other hand, with the present invention, the fact that the false reflection search time T_FAKE between the first reflected light peak Ts and the second reflected light peak Tf of the false reflection during the focus search remains substantially constant regardless of the type of the optical disk 101 is utilized. Specifically, a ratio rather than the time are used as a threshold. In particular, the false reflection search time T_FAKE is used as a reference, and a ratio r between the false reflection search time T_FAKE and the focus search time T_DATA that takes to reach the information recording face from the lower disk surface during the focus search is calculated. Then, the type of the optical disk 101 is identified by comparing the calculated ratio r to the threshold.

As shown in FIGS. 3A and 3B, because of the variance in the characteristics between the optical disk devices A and B, a relationship of the false reflection search times T_FAKE of the optical disk devices A and B and a relationship of the focus search times T_DATA of the optical disk devices A and B are such that:

$$(T\_FAKE\_A) < (T\_FAKE\_B),$$

$$(T\_DATA\_CD\_A) < (T\_DATA\_CD\_B).$$

Meanwhile, when the CD is mounted in the optical disk device A, the ratio r_A between the false search time T_FAKE_A and the focus search time T_DATA_CD_A is calculated as follows:

$$r\_A = (T\_DATA\_CD\_A)/(T\_FAKE\_A).$$

When the CD is mounted in the optical disk device B, the ratio r_B between the false search time T_FAKE_A and the focus search time T_DATA_CD_B is calculated as follows:

$$r\_B = (T\_DATA\_CD\_B)/(T\_FAKE\_B).$$

As shown in FIGS. 3A and 3B, because of the variance in the characteristics, each of the false search time and the focus search time is longer with the optical disk device B than with the optical disk device A. However, the ratios r_A and r_B are constant regardless of the variance in the characteristics, and the relationship of the ratios r_A and r_B is obtained as follows:

$$r\_A = r\_B.$$

The false reflection occurs at a specific timing after the reflection at the lower disk surface is detected regardless of the type of the optical disk 101. Thus, not only for the CD but also for the DVD and the BD, the ratio between the false search time and the focus search time can be used as a constant reference, regardless of the variance in the characteristics had by individual optical disk devices.

Figure 4:
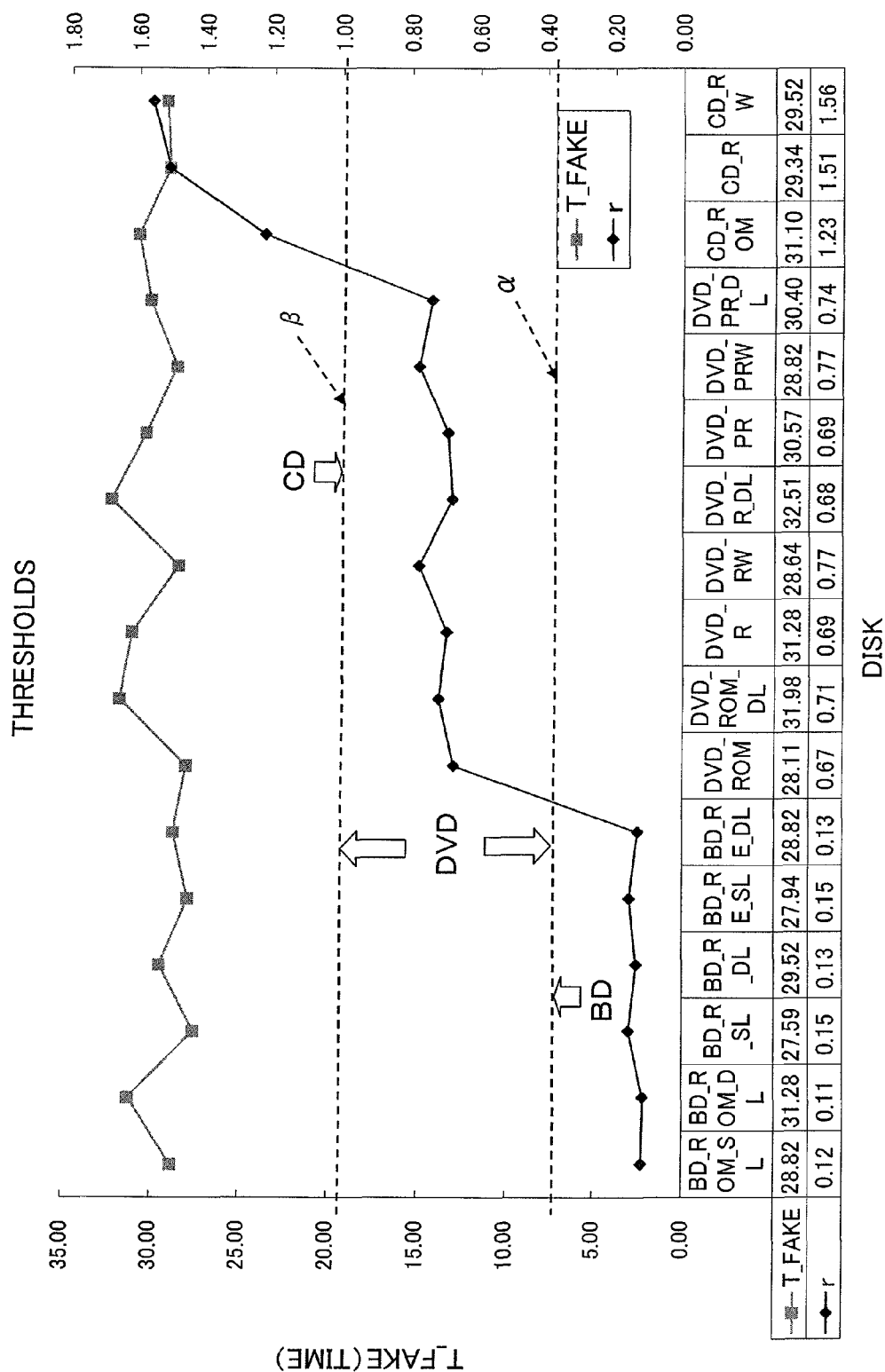
FIG. 4 is a diagram illustrating a relationship between a false reflection search time T_FAKE and types of the optical disks and a relationship between a ratio r and the types of the optical disks.

FIG. 4 shows the relationship between the false reflection search time T_FAKE and the types of the optical disks, and the relationship between the ratio r and the types of the optical disks. The false reflection search time T_FAKE is measured by emitting the CD-use laser beam to the optical disk 101 and detecting the first reflected light peak Ts and the second reflected light peak Tf. The ratio r is calculated by emitting the DVD-use laser beam or the BD-use laser beam to the optical disk 101, detecting the first reflected light peak Ts and the third reflected light peak, measuring the focus search time T_DATA and dividing the focus search time T_DATA by the false reflection search time T_FAKE. The false reflection search time T_FAKE is expressed as a line graph in which squares serve as the plot points. Each of the false reflection search times T_FAKE for each of the optical disks is distributed around 30 msec, and remain substantially constant regardless of the types of the optical disks. The ratio r is calculated by dividing the focus search time T_DATA by the false reflection search time T_FAKE. The ratio r is expressed as a line graph with diamond-shaped plot points. As shown in FIG. 4, the numerical value of the ratio r is distributed around a low value of about 0.10 with the BD, around 0.70 with the DVD and around a high value of 1.20 to 1.60 with the CD. In other words, the groups to which the three types of the optical disks belong, respectively, are distributed into clearly separated numerical value ranges. As shown in FIG. 4, the thresholds α and β to distinguish the groups of the three types of the optical disks are set so that the optical disk 101 for which the ratio r is less than the threshold α is determined to be the BD, the optical disk 101 for which the ratio r is at least the threshold α and no more than the threshold β is determined to be the DVD, and the optical disk 101 for which the ratio r is greater than the threshold β is the CD. In short, the ratio r is calculated as follows: r=(T_DATA)/(T_FAKE). Then, the type of the optical disk 101 is determined to be the BD (or the next-generation optical disk) when r<α. The type of the optical disk 101 is determined to be the DVD when α≦r≦β. The type of the optical disk 101 is determined to be the CD when β<r.

Figure 5:
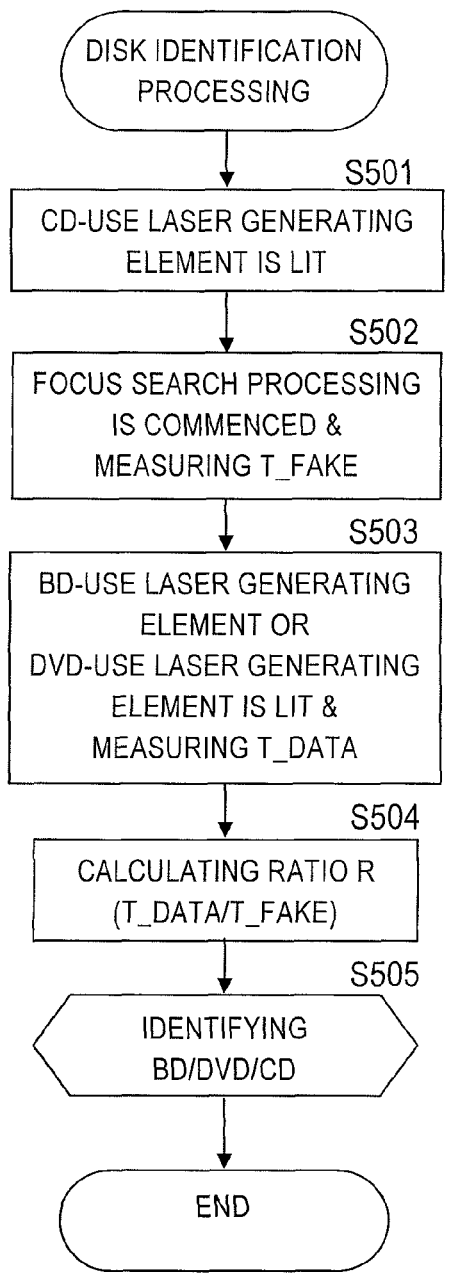
FIG. 5 is a flowchart illustrating a disk identification processing in accordance with the first embodiment of the present invention.

The disk identification processing will be further described through reference to FIG. 5. First, the CD-use laser generating element 112 is lit by the drive circuit 117 (step S501). The focus drive section 104 moves the optical pickup 102 up and down with respect to the lower disk surface of the optical disk 101 according to a focus search command from the focus control section 119. Specifically, the focus search processing is commenced from a location farthest away from the lower disk surface towards the upper disk surface. The reflected light from the optical disk 101 is received by the light receiving element 113. The reflected light received by the light receiving element 113 is detected by the detection circuit 105 and is outputted as the electrical signal. The electrical signal from the detection circuit 105 is calculated by the focus sum signal calculation section 107, and outputted as the FS signal. The time measurement section 121 of the controller 103 measures the false reflection search time T_FAKE between when the FS signal from the focus sum signal calculation section 107 attains the maximum point (e.g., the first reflected light peak Ts) by receiving the reflected light from the lower disk surface of the optical disk 101, and when the FS signal from the focus sum signal calculation section 107 attains the maximum point (e.g., the second reflected light peak Tf) by receiving the false reflected light (step S502). When the time measurement section 121 measures the false reflection search time T_FAKE in step S502, the time measurement section 121 halts detecting the second reflected light peak Tf until a masking period has elapsed after the time measurement section 121 detects the first reflected light peak Ts. The masking period is set to a predetermined period that is longer than the focus search time T_DATA_BD regardless of the variance in the characteristics of the optical devices so that the measurement section 121 is prevented from mistakenly detecting the third reflected light peak as the second reflected light peak Tf even when the BD is mounted to the optical device. After the masking period has elapsed, the time measurement section 121 commences the detection of the second reflected light peak Tf, and measures the false reflection search time T_FAKE when the second reflected light peak Tf is detected.

Furthermore, the BD-use laser generating element 110 or the DVD-use laser generating element 111 is lit by respective one of the drive circuits 115 and 116, and the focus search processing is performed in the same manner as in step S501. Then, the time measurement section 121 measures the focus search time T_DATA. Specifically, the focus search time T_DATA is a period from when the reflected light is detected from the lower disk surface of the optical disk 101, until the reflected light is detected from the information recording face of the optical disk 101 (step S503). More specifically, the focus search time T_DATA is a period from when the FS signal from the focus sum signal calculation section 107 attains the maximum point (e.g., the first reflected light peak Ts) by receiving the reflected light from the lower disk surface of the optical disk 101, until the FS signal from the focus sum signal calculation section 107 attains the maximum point (e.g., the third reflected light peak) by receiving the reflected light from the information recording face of the optical disk 101. Then, the disk identification section 122 of the controller 103 calculates the ratio r from the focus search time T_DATA and the false reflection search time T_FAKE with the formula (T_DATA)/(T_FAKE) (step S504). Furthermore, the disk identification section 122 compares the calculated ratio r to the thresholds $\alpha$ and $\beta$ stored in the memory 120 to identify the type of the optical disk 101. Specifically, the type of the optical disk 101 is identified as being either the BD, the DVD, or the CD based on the conditions. Namely, the disk identification section 122 determines that the type of the optical disk 101 is the BD (or the next-generation optical disk) when $r<\alpha$, the DVD when $\alpha \leq r \leq \beta$, and the CD when $\beta<r$ (step S505). Here, the thresholds $\alpha$ and $\beta$ are set to about $\alpha=0.40$ and $\beta=1.00$. These thresholds are preferably set according to testing work performed at the design stage of the optical disk device.

With the optical disk device, the false reflection search time T_FAKE is used as a reference time. The ratio r is a ratio of the false reflection search time T_FAKE to the focus search time T_DATA. Furthermore, the ratio r is compared with the threshold $\alpha$ and $\beta$. Then, the type of the optical disk 101 mounted in the optical disk device is identified. Thus, the type of the optical disk 101 can be reliably identified regardless of the variance in the focus search time T_DATA caused by the variance in the characteristics of the constituent elements of individual optical disk devices. Also, the type of the optical disk 101 can be reliably identified even if the focus actuator sensitivity decreases because of a drop in the performance of the optical pickup 102 due to changes over time.

With the optical disk device, the ratio r is calculated by dividing the focus search time T_DATA by the false reflection search time T_FAKE. Thus, the type of the optical disk 101 can be reliably identified without being affected by error in the focus search time T_DATA due to the variance in the characteristics of the constituent elements of individual optical disk devices.

With the optical disk device, it is possible to identify at least the CD, the DVD, and the next-generation optical disk.

With the optical disk device, it is possible to detect the false reflected light reliably by emitting the CD laser beam when the false reflected light is detected.

With the optical disk device, the ratio r is calculated by dividing the focus search time T_DATA by the false reflection search time T_FAKE. Furthermore, the thresholds $\alpha$ and $\beta$ are set such that the type of the optical disk 101 is determined to be the next-generation optical disk when $r<\alpha$, the DVD when $\alpha \leq r \leq \beta$ and the CD when $\beta<r$. Thus, it is possible to reliably identify the type of the optical disk 101.

If the individual sensitivity characteristics of the actuator 114 vary with the individual optical disk devices, then the focus search speed and the focus search time T_DATA also vary. Therefore, if the focus search time T_DATA is used as an identification criterion as in prior art, then there is the possibility of misidentification occurring because the focus search time T_DATA varies with the individual optical disk devices. With the optical disk device of the present invention, the ratio of the focus search time T_DATA to the false reflection search time T_FAKE is used as the identification criterion. Thus, the type of the optical disk 101 can be reliably identified regardless of any variance in the focus search speed from one optical disk device to the next.

Second Embodiment

Figure 6:
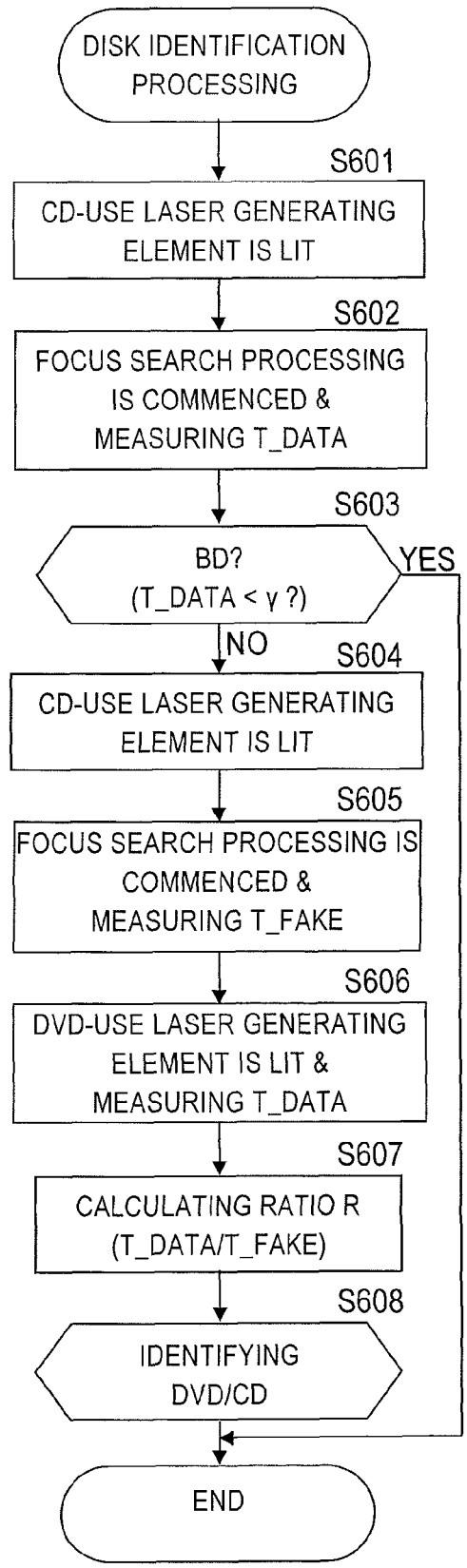
FIG. 6 is a flowchart illustrating a disk identification processing in accordance with a second embodiment of the present invention.

Referring now to FIG. 6, a disk identification processing in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIGS. 3A and 3B, the focus search time T_DATA from the lower disk surface of the optical disk 101 to the information recording face of the optical disk 101 is far shorter with the BD than with the CD or the DVD. This difference is utilized to give priority to identifying whether or not the optical disk 101 is the BD when the optical disk 101 is mounted in the optical disk device in order to reduce the processing time of the disk identification processing.

As shown in FIG. 6, first, the BD-use laser generating element 110 is lit by the drive circuit 115 (step S601). The focus drive section 104 moves the optical pickup 102 up and down with respect to the lower disk surface of the optical disk 101 according to the focus search command from the focus control section 119. Specifically, the focus search processing is commenced from a location farthest away from the lower disk surface towards the upper disk surface. The reflected light from the optical disk 101 is received by the light receiving element 113. The reflected light received by the light receiving element 113 is detected by the detection circuit 105 and is outputted as the electrical signal. The electrical signal from the detection circuit 105 is calculated by the focus sum signal calculation section 107. The time measurement section 121 of the controller 103 measures the focus search time T_DATA between when the FS signal from the focus sum signal calculation section 107 attains the maximum point (e.g., the first reflected light peak Ts) by receiving the reflected light from the lower disk surface of the optical disk 101, and when the FS signal attains the maximum point (e.g., the third reflected light peak) by receiving the reflected light from the information recording face (step S602).

Then, the disk identification section 122 of the controller 103 compares the focus search time T_DATA with a threshold γ stored in the memory 120. Specifically, it is determined whether or not the optical disk 101 is the BD based on whether or not the focus search time T_DATA measured in step S602 exceeds the threshold γ (step S603). If the focus search time T_DATA is less than the threshold γ, then the disk identification section 122 determines that the type of the optical disk 101 is the BD. Then, the disk identification processing is concluded.

If the focus search time T_DATA is greater than the threshold γ, then the CD-use laser generating element 112 is lit by the drive circuit 117 (step S604). Furthermore, the focus drive section 104 moves the optical pickup 102 up and down with respect to the lower disk surface of the optical disk 101 according to the focus search command from the focus control section 119. Then, the focus search processing is commenced. The reflected light from the optical disk 101 is received by the light receiving element 113. The reflected light received by the light receiving element 113 is detected by the detection circuit 105 and is outputted as the electrical signal. The electrical signal from the detection circuit 105 is calculated by the focus sum signal calculation section 107. The time measurement section 121 of the controller 103 measures the false reflection search time T_FAKE between when the FS signal from the focus sum signal calculation section 107 attains the maximum point (e.g., the first reflected light peak Ts) by receiving the reflected light from the lower disk surface of the optical disk 101, and when the FS signal from the focus sum signal calculation section 107 attains the maximum point (e.g., the second reflected light peak Tf) by receiving the false reflected light (step S605).

Next, the DVD-use laser generating element 111 is lit by the drive circuit 115. Then, the focus search processing is performed in the same manner as in step S605. The focus search time T_DATA from when the reflected light is detected from the lower disk surface of the optical disk 101 until the reflected light is detected from the information recording face of the optical disk 101 is measured (step S606). Then, the disk identification section 122 of the controller calculates the ratio r based on the false reflection search time T_FAKE measured in the step S605 and the focus search time T_DATA measured in the step S606 with the formula (T_DATA)/(T_FAKE) (step S607). The disk identification section 122 further compares the ratio r with the threshold β. Then, the disk identification section 122 determines that the type of the optical disk 101 is either the DVD or the CD based on the conditions. Namely, the disk identification section 122 determines that the type of the optical disk 101 is the DVD when $r \leq \beta$, and the CD when $\beta < r$ (step S608). Then, the disk identification processing for all types of the optical disks is concluded.

Here, the threshold β is set to about $\beta=1.00$. The threshold γ is set to between 2 and 7 msec. These thresholds are preferably set according to testing work performed at the design stage of the optical disk device.

With the optical disk device, first, the focus search time T_DATA is measured by emitting the BD-use (e.g., the next-generation optical disk-use) laser beam. Then, the disk identification section 122 determines if the focus search time T_DATA is no more than the threshold γ. Thus, the type of the optical disk 101 mounted in the optical disk device can be identified without calculating the ratio r when the BD has been mounted. As a result, the disk identification processing can be completed immediately.

Third Embodiment

Figure 7:
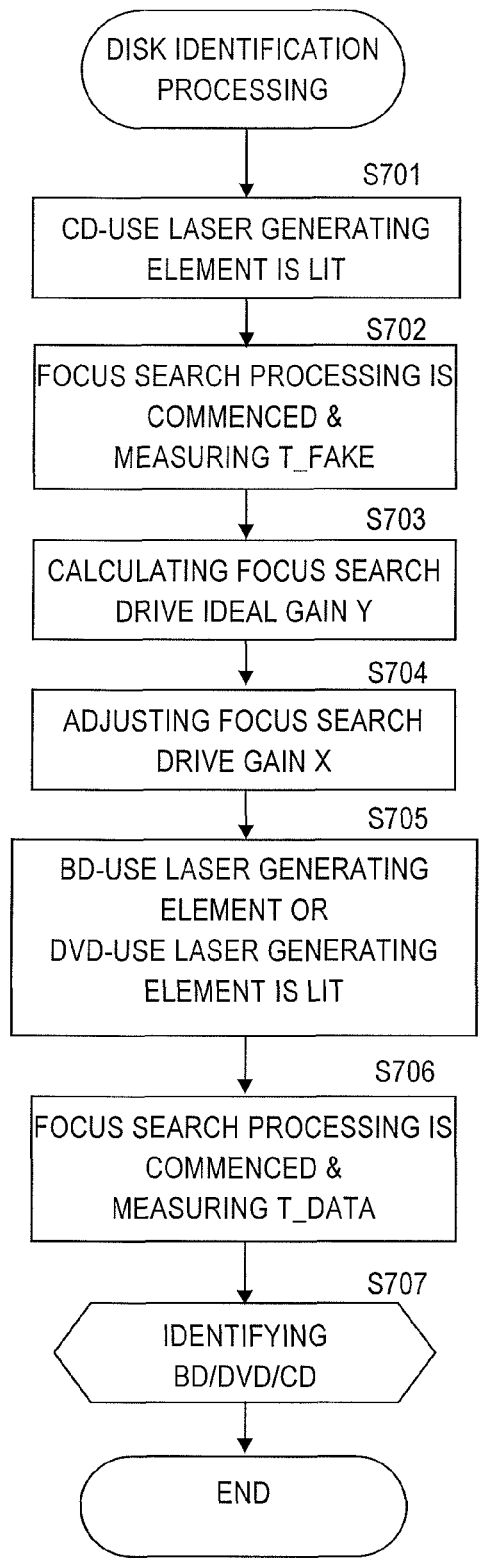
FIG. 7 is a flowchart illustrating a disk identification processing in accordance with a third embodiment of the present invention.

Referring now to FIG. 7, a disk identification processing in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

As shown in FIG. 7, first, the CD-use laser generating element 112 is lit (step S701). Then, the focus search processing is commenced. The time measurement section 121 measures the false reflection search time T_FAKE in the same manner as in step S502 (step S702). The disk identification section 122 of the controller 103 calculates a coefficient C for adjusting a focus search drive gain X of the actuator 114 to a focus search drive ideal gain Y (step S703). The focus search drive ideal gain Y is a gain for adjusting the focus search speed to a specific speed. The focus search drive gain X is a gain of the actuator 114 of the optical disk device that has not yet been adjusted. The method for calculating the focus search drive ideal gain Y will be described here. As described above, the false reflected light is detected at a specific timing after the reflected light from the lower disk surface of the optical disk is detected regardless of the types of the optical disks. The memory 120 stores an ideal false reflection search time T_FAKE_TARGET that is the false reflection search time T_FAKE obtained when the focus search processing is performed at an ideal focus search speed. The ideal false reflection search time T_FAKE_TARGET is used as an index for adjusting the focus search speed to all types of the optical disks. In step S702, the false reflection search time T_FAKE_X is measured during the focus search processing with the focus search drive gain X. The relationship between the focus search drive gain X and the focus search drive ideal gain Y is as follows:

$$X:Y = T\_FAKE\_X : T\_FAKE\_TARGET.$$

Thus, the focus search drive ideal gain Y is calculated from the following equation.

$$Y = X \times T\_FAKE\_TARGET \div T\_FAKE\_X$$

Therefore, the coefficient C for adjusting the focus search drive gain X to the focus search drive ideal gain Y is:

$$T\_FAKE\_TARGET \div T\_FAKE\_X.$$

As shown in FIG. 7, the focus search drive gain X is adjusted with the coefficient C calculated in step S703 (step S704). Then, either the BD- or DVD-use laser generating element 110 or 111 is lit (step S705). Furthermore, the focus search processing is performed again. Then, the time measurement section 121 measures the focus search time T_DATA (step S706). Then, the disk identification section 122 determines the type of the optical disk 101 by comparing the focus search time T_DATA with predetermined thresholds stored in the memory 120 (step S707). The predetermined thresholds are set so that the BD, the DVD and the CD are distinguished based on the focus search time T_DATA.

The false reflection is the reflected light that is detected at the distinct level when the focus search processing has been performed with the CD-use laser beam. If the CD-use laser generating element 112 is lit to measure the focus search time T_DATA, then there is the possibility that the type of the optical disk 101 is mistakenly identified because the false reflected light of the high level ends up being detected in the focus search processing. As a result, the false reflection search time T_FAKE is erroneously detected as the focus search time T_DATA, and the ratio r is inadequately calculated. Thus, when the focus search time T_DATA is measured, it is preferably measured by lighting the BD-use laser generating element 110 or the DVD-use laser generating element 111.

In the first embodiment, the false reflection search time T_FAKE is measured before the focus search time T_DATA is measured. However, the false reflection search time T_FAKE can measured after the focus search time T_DATA is measured.

Also, the FS signal from the focus sum signal calculation section 107 is used to detect the timing from the waveform shown in FIG. 3. Specifically, the time measurement section 121 uses the FS signal from the focus sum signal calculation section 107 in order to detect the timings of reflection at the disk surface, the false reflection and reflection at the information recording face by obtaining a local maximum point of the FS signal. The time measurement section 121 can use a focus error signal outputted from the focus error signal calculation section 106 to detect the timings of the reflection at the disk surface, the false reflection and the reflection at the information recording face. Specifically, the time measurement section 121 can detect the timings by obtaining a zero cross point with respect to a ground level in an S-shaped curve waveform of the focus error signal. With the optical disk device, the detection of the reflected light is performed based on the local maximum point of the focus sum signal or the zero cross point of the focus error signal. Thus, it is possible to detect the reflected light at a reliable timing.

The present invention is favorable for an optical disk device having a function of identifying the type of the optical disk 101 mounted in the optical disk device, and is particularly favorable for an optical disk device having a function of identifying the type of the optical disk 101 from among at least the CD, the DVD, and the next-generation optical disk.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of an optical disk device equipped with the present invention. Accordingly, these terms, as utilized to describe the present invention should be interpreted relative to an optical disk device equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. An optical disk device comprising:
   an optical pickup configured to selectively emit a plurality of laser beams of different wavelengths to an optical disk mounted in the optical disk device;
   a focus drive section configured to drive the optical pickup to move a focus position of the optical pickup in a direction perpendicular to the optical disk;
   a detection section configured to detect reflected light reflected from the optical disk while the focus drive section moves the focus position of the optical pickup;
   a time measurement section configured to measure a focus search time while the focus drive section moves the focus position of the optical pickup with the focus search time being a period between when the reflected light reflected from a disk surface of the optical disk is detected and when the reflected light reflected from an information recording layer of the optical disk is detected, and the time measurement section further configured to measure a false reflection search time while the focus drive section moves the focus position of the optical pickup with the false reflection search time being a period between when the reflected light reflected from the disk surface of the optical disk is detected and when false reflection light is detected, the false reflection light being detected when the focus position of the optical pickup is located at a position other than the disk surface and the information recording layer of the optical disk; and
   a disk identification section configured to calculate a ratio of the focus search time to the false reflection search time, and identify a type of the optical disk based on the ratio.

2. The optical disk device according to claim 1, wherein the disk identification section is configured to calculate the ratio by dividing the focus search time by the false reflection search time.

3. The optical disk device according to claim 2, wherein the disk identification section is configured to identify the type of the optical disk from among a CD, a DVD and a next-generation optical disk.

4. The optical disk device according to claim 3, wherein the detection section is configured to detect the false reflection light while the optical pickup emits a CD-use laser beam.

5. The optical disk device according to claim 1, wherein the disk identification section is configured to identify the type of the optical disk from among a CD, a DVD and a next-generation optical disk.

6. The optical disk device according to claim 1, wherein the detection section is configured to detect the false reflection light while the optical pickup emits a CD-use laser beam.

7. The optical disk device according to claim 1, wherein the disk identification section is configured to compare the ratio with a first threshold and a second threshold that is greater than the first threshold, and determine that the type of the optical disk is a next-generation optical disk when the ratio is smaller than the first threshold, that the type of the optical disk is a DVD when the ratio is equal to or greater than the first threshold and is equal to or smaller than the second threshold, and that the type of the optical disk is a CD when the ratio is greater than the second threshold.

8. An optical disk device comprising:
an optical pickup configured to selectively emit a plurality of laser beams of different wavelengths to an optical disk mounted in the optical disk device;
a focus drive section configured to drive the optical pickup to move a focus position of the optical pickup in a direction perpendicular to the optical disk;
a detection section configured to detect reflected light reflected from the optical disk while the focus drive section moves the focus position of the optical pickup;
a time measurement section configured to measure a focus search time while the focus drive section moves the focus position of the optical pickup with the focus search time being a period between when the reflected light reflected from a disk surface of the optical disk is detected and when the reflected light reflected from an information recording layer of the optical disk is detected, and the time measurement section further configured to measure a false reflection search time while the focus drive section moves the focus position of the optical pickup with the false reflection search time being a period between when the reflected light reflected from the disk surface of the optical disk is detected and when false reflection light is detected, the false reflection light being detected when the focus position of the optical pickup is located at a position other than the disk surface and the information recording layer of the optical disk; and
a disk identification section configured to calculate a ratio of the focus search time to the false reflection search time, and identify a type of the optical disk based on the ratio,
the time measurement section being further configured to determine a timing when the reflected light from the disk surface of the optical disk is detected, a timing when the reflected light from the information recording layer of the optical disk is detected and a timing when the false reflection light is detected, respectively, by obtaining a local maximum of a focus sum signal or a zero cross point of a focus error signal.

9. The optical disk device according to claim 8, wherein the disk identification section is configured to calculate the ratio by dividing the focus search time by the false reflection search time.

10. The optical disk device according to claim 9, wherein the disk identification section is configured to identify the type of the optical disk from among a CD, a DVD and a next-generation optical disk.

11. The optical disk device according to claim 10, wherein the detection section is configured to detect the false reflection light while the optical pickup emits a CD-use laser beam.

12. The optical disk device according to claim 11, wherein the disk identification section is configured to compare the ratio with a first threshold and a second threshold that is greater than the first threshold, and determine that the type of the optical disk is the next-generation optical disk when the ratio is smaller than the first threshold, that the type of the optical disk is the DVD when the ratio is equal to or greater than the first threshold and is equal to or smaller than the second threshold, and that the type of the optical disk is the CD when the ratio is greater than the second threshold.

13. The optical disk device according to claim 11, wherein the disk identification section is further configured to identify the type of the optical disk without calculating the ratio when the focus search time measured while the optical pickup emits a next-generation optical disk-use laser beam is no more than a specific time.

14. The optical disk device according to claim 13, wherein the disk identification section is further configured to determine that the type of the optical disk is the next-generation optical disk when the focus search time measured while the optical pickup emits the next-generation optical disk-use laser beam is no more than the specific time.

15. An optical disk device comprising:
an optical pickup configured to selectively emit a plurality of laser beams of different wavelengths to an optical disk mounted in the optical disk device;
a focus drive section configured to drive the optical pickup to move a focus position of the optical pickup in a direction perpendicular to the optical disk;
a detection section configured to detect reflected light reflected from the optical disk while the focus drive section moves the focus position of the optical pickup;
a time measurement section configured to measure a focus search time while the focus drive section moves the focus position of the optical pickup with the focus search time being a period between when the reflected light reflected from a disk surface of the optical disk is detected and when the reflected light reflected from an information recording layer of the optical disk is detected, and the time measurement section further configured to measure a false reflection search time while the focus drive section moves the focus position of the optical pickup with the false reflection search time being a period between when the reflected light reflected from the disk surface of the optical disk is detected and when false reflection light is detected, the false reflection light being detected when the focus position of the optical pickup is located at a position other than the disk surface and the information recording layer of the optical disk; and
a disk identification section configured to calculate a ratio of the focus search time to the false reflection search time, and identify a type of the optical disk based on the ratio,
the disk identification section being further configured to identify the type of the optical disk without calculating the ratio when the focus search time measured while the optical pickup emits a next-generation optical disk-use laser beam is no more than a specific time.

16. The optical disk device according to claim 15, wherein the disk identification section is further configured to determine that the type of the optical disk is a next-generation optical disk when the focus search time measured while the optical pickup emits the next-generation optical disk-use laser beam is no more than the specific time.

17. A disk identification method comprising:

emitting a first laser beam to an optical disk;

detecting reflected light of the first laser beam reflected from a disk surface of the optical disk and false reflection light of the first laser beam while moving a focus position of an optical pickup in a direction perpendicular to the optical disk with the false reflection light being detected when the focus position of the optical pickup is located at a position other than the disk surface and an information recording layer of the optical disk;

measuring a false reflection search time between the detecting of the reflected light reflected from the disk surface of the optical disk and the detecting of the false reflection light;

emitting a second laser beam to the optical disk;

detecting reflected light of the second laser beam reflected from the disk surface of the optical disk and the information recording layer of the optical disk while moving the focus position of the optical pickup in the direction perpendicular to the optical disk;

measuring a focus search time between the detecting of the reflected light reflected from the disk surface of the optical disk and the detecting of the reflected light reflected from the information recording layer of the optical disk;

calculating a ratio of the focus search time to the false reflection search time; and identifying a type of the optical disk based on the ratio.

* * * * *